US006617042B2

(12) United States Patent
DeAngelis

(10) Patent No.: US 6,617,042 B2
(45) Date of Patent: Sep. 9, 2003

(54) DIELECTRIC COATING FOR TRANSDUCTION DRIVERS

(75) Inventor: Matthew M. DeAngelis, Bedford, NH (US)

(73) Assignee: BAE Systems Information and Electronic Systems Integration Inc., Nashuo, NH (US)

( * ) Notice: Subject to any disclaimer, the term of this patent is extended or adjusted under 35 U.S.C. 154(b) by 0 days.

(21) Appl. No.: 10/308,321

(22) Filed: Dec. 3, 2002

(65) Prior Publication Data

US 2003/0129429 A1 Jul. 10, 2003

Related U.S. Application Data

(60) Provisional application No. 60/347,641, filed on Jan. 10, 2002.

(51) Int. Cl.[7] ......................... B32B 27/06; B32B 27/16; B32B 27/36; B05D 3/00; B05D 3/12

(52) U.S. Cl. ....................... 428/480; 427/214; 427/294; 427/295; 427/296; 427/350; 427/385.5; 427/388.1; 427/407.1; 427/58; 427/100; 29/594; 29/595; 29/603.01; 29/609.1; 367/140

(58) Field of Search .......................... 428/480; 427/214, 427/294, 295, 296, 350, 384, 385.5, 388.1, 407.1, 58.1; 29/594, 595, 603.01, 609.1; 367/140

(56) References Cited

U.S. PATENT DOCUMENTS 4,439,642 A 3/1984 Reynard
4,459,854 A 7/1984 Richardson et al.
4,769,795 A 9/1988 Masssa et al.
4,901,293 A 2/1990 Kuhn
4,947,075 A 8/1990 Maury et al.
5,228,176 A 7/1993 Bui et al.
5,416,424 A 5/1995 Andermo
5,436,776 A * 7/1995 Kurokawa ............... 360/97.03
5,450,373 A 9/1995 Kupiszewski et al.
5,850,109 A 12/1998 Mock et al.
6,051,169 A * 4/2000 Brown et al. .............. 264/40.1

FOREIGN PATENT DOCUMENTS

FR 2116922 A * 7/1972

OTHER PUBLICATIONS

Phelps Dodge Magent Wire Company, Armored Poly–Thermaleze 2000 (APTZ), Company Data Sheets, pp. 20–22.

Dolph's –John C. Dolph Company, Selection Chart –Electronics –Compounds and Encapsulants, Company Product Literature, 6 pages, Monmouth Junction, NJ USA.

* cited by examiner

*Primary Examiner*—Vivian Chen
(74) *Attorney, Agent, or Firm*—Maine & Asmus

(57) ABSTRACT

A degassed polyester varnish is applied to the transduction driver to increase surface dielectric strength (insulation resistance), driver voltage breakdown, physical protection, and heat and water resistance. A vacuum chamber application process is used to apply the polyester varnish. The disclosed coating technique is applicable to all transducer drive materials and all transducer types.

21 Claims, 4 Drawing Sheets

DIELECTRIC COATING FOR TRANSDUCTION DRIVERS

RELATED APPLICATIONS

This application claims the benefit of U.S. Provisional Application No. 60/347,641, filed Jan. 10, 2002, which is herein incorporated in its entirety by reference.

FIELD OF THE INVENTION

The invention relates to transducers, and more particularly, to an improved dielectric coating for transduction drivers.

BACKGROUND OF THE INVENTION

Acoustical transducers convert electrical energy to acoustical energy, and vice-versa, and can be employed in a number of applications. For example, transducers are a primary component used in sonar applications such as underwater seismic prospecting and detection of mobile vessels in, such applications, acoustic transducers are generally referred to as projectors and receivers. Projectors convert electrical energy into mechanical vibrations that imparts sonic energy into the water. Receivers are used to intercept reflected sonic energy and convert the associated mechanical vibrations into electrical signals. Multiple projectors and receivers can be employed to form arrays for detecting underwater objects.

A projector typically includes an electromechanical stack of ceramic or rare earth elements having a particular crystalline structure. Depending on the crystal structure and material, a projector may be, for example, piezoelectric, electrostrictive, or magnetostrictive. For instance, if a ceramic crystal is subjected to a high direct current voltage during the manufacturing process, the ceramic crystal becomes permanently polarized and operates as a piezoelectric. An electrical signal applied to the ceramic crystal generates mechanical vibrations. A plurality of such crystals can be configured in a stack to provide greater vibrations, and is commonly referred to as a "driver" or "transduction driver."

In another instance, direct current voltage can be temporarily applied to a ceramic stack during operation to provide polarization of the crystals. Under such conditions, the operation of the projector is electrostrictive. After the application of direct current voltage is discontinued, the electrostrictive ceramic stack is no longer polarized, and vibrations stop. In a third instance, a magnetostrictive stack is exposed to a direct current magnetic field via a coil and the stack material magnetic domains are aligned. An electrical signal applied to the coil causes the stack to generate vibrations.

One type of projector is a flextensional sonar projector, which is typically a low frequency transducer. Low frequency acoustic signals are desirable because they are less attenuated by the water through which they travel, which allows the signals to travel great distances. A flextensional transducer includes a piezoelectric, electrostrictive, or magnetostrictive driver housed in a mechanical projector shell. Vibration of the driver is caused by application of an alternating electrical signal, which produces magnified vibrations in the shell thereby generating acoustic waves in the water. The shell vibrations are dependent upon the piezoelectric, electrostrictive, or magnetostrictive properties of the driver.

The driver is typically coated with a dielectric coating to prevent corrosion of the stack elements if the internal environment of the transducer becomes exposed, and to ensure that the high voltage actuating signal is delivered to the driver and not short-circuited. Such a short-circuit may be from lead to lead of the driver, or from one or both of the driver leads to ground.

A typical technique for coating a transduction driver consists of applying a single acrylic coating. This coating limits the drive voltage field that can be applied to the transducer, which is typically about 10 V/mil. Conventional acrylic coatings are associated with many other disadvantages as well. For example, acrylic is marginally water resistant, has less than optimal adhesion and a low thermal breakdown temperature, and has only moderate dielectric strength.

What is needed, therefore, is a transduction driver coating material that has a high water resistance, a high breakdown temperature, and high dielectric strength.

BRIEF SUMMARY OF THE INVENTION

One embodiment of the present invention provides a coating for transduction drivers. The coating includes one or more coats of a polyester varnish that has been degassed. Each coat is applied to a transduction driver under vacuum. In one such embodiment, the one or more coats of degassed polyester varnish include a first coat of the degassed polyester varnish that is applied to the transduction driver under vacuum, and a second coat of the degassed polyester varnish that is applied to the transduction driver under vacuum while the first coat is still tacky. The one or more coats of degassed polyester varnish may further include a third coat of the degassed polyester varnish that is applied to the transduction driver under vacuum after the first and second coats are cured. In one particular embodiment, the polyester varnish has a dry dielectric strength of 1000 V/mil or more, and a viscosity under 200 CPS. The first, second, and third coats may be cured by air drying at room temperature.

Another embodiment of the present invention provides a method of coating a transduction driver. The method includes degassing a polyester varnish thereby forming a degassed polyester varnish. The method further includes applying a first coat of the degassed polyester varnish to the driver while under vacuum, and then applying a second coat of the degassed polyester varnish to the driver while the first coat is still tacky under vacuum. The method proceeds with curing the first and second coats of degassed polyester varnish. The method continues with applying a third coat of the degassed polyester varnish to the driver under vacuum after the first and second coats are cured, and curing the third coat of degassed polyester varnish. The polyester varnish can be, for example, Dolph's AC-43. Note that the degassing and applying steps can be performed simultaneously, where the degassing is achieved by virtue that the polyester varnish is applied under a vacuum.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

An improved dielectric coating for transduction drivers is disclosed. The coating material has a high water resistance, a high breakdown temperature, and high dielectric strength. The driver is therefore protected.

General Overview

A coating of degassed polyester varnish is applied to all the exposed surfaces of the transduction driver of an underwater transducer thereby increasing the driver's surface dielectric strength (insulation resistance), surface adhesion for better driver voltage breakdown and physical protection, and surface heat and water resistance. This degassed polyester varnish can be applied to all transduction driver materials and all transducer types, and can be air dried at room temperature.

Typical driver types and materials include, for example, piezoelectric ceramic (e.g., PZT), electrostrictive (e.g., PMN or PMN-PT), magnetostrictive (Terfenol-D, Metglass, or Nickel), single crystal technology, and other suitable driver types and composite transduction materials. Typical transducer types include, for example, slotted cylinders, flextensionals, barrel stave flextensionals, bender discs, Tonpilz, and other underwater projectors.

The degassed polyester varnish is applied in multiple coats using a vacuum chamber process. In one embodiment, three coats of degassed polyester varnish are applied, with the second coat being applied while the first coat is still tacky. The third coat is applied after the first two coats are cured. Alternative embodiments may have less coats (e.g., only the first two coats) or more coats depending on factors such as desired coating qualities and manufacturing time.

The viscosity of the degassed polyester varnish allows for greater penetration into the pores of the electromechanical driver material as compared to a more viscous acrylic coating. As such, the degassed polyester varnish adheres significantly better to the driver than does acrylic. In addition, the resulting protective barrier is significantly better at preventing damage and surface voltage breakdown than an acrylic barrier. Also, water resistance is further improved by the properties of the degassed polyester varnish as compared to acrylic.

Thus, a driver coating process in accordance with the principles of the present invention provides a highly water resistant barrier with greater dielectric strength. The costly driver is thereby protected from potential water leaks, and repairs to the transducer are faster, less expensive, and easier as compared to repairing a driver having an acrylic coating.

Example Transducer Types and Configurations

Figure 1:
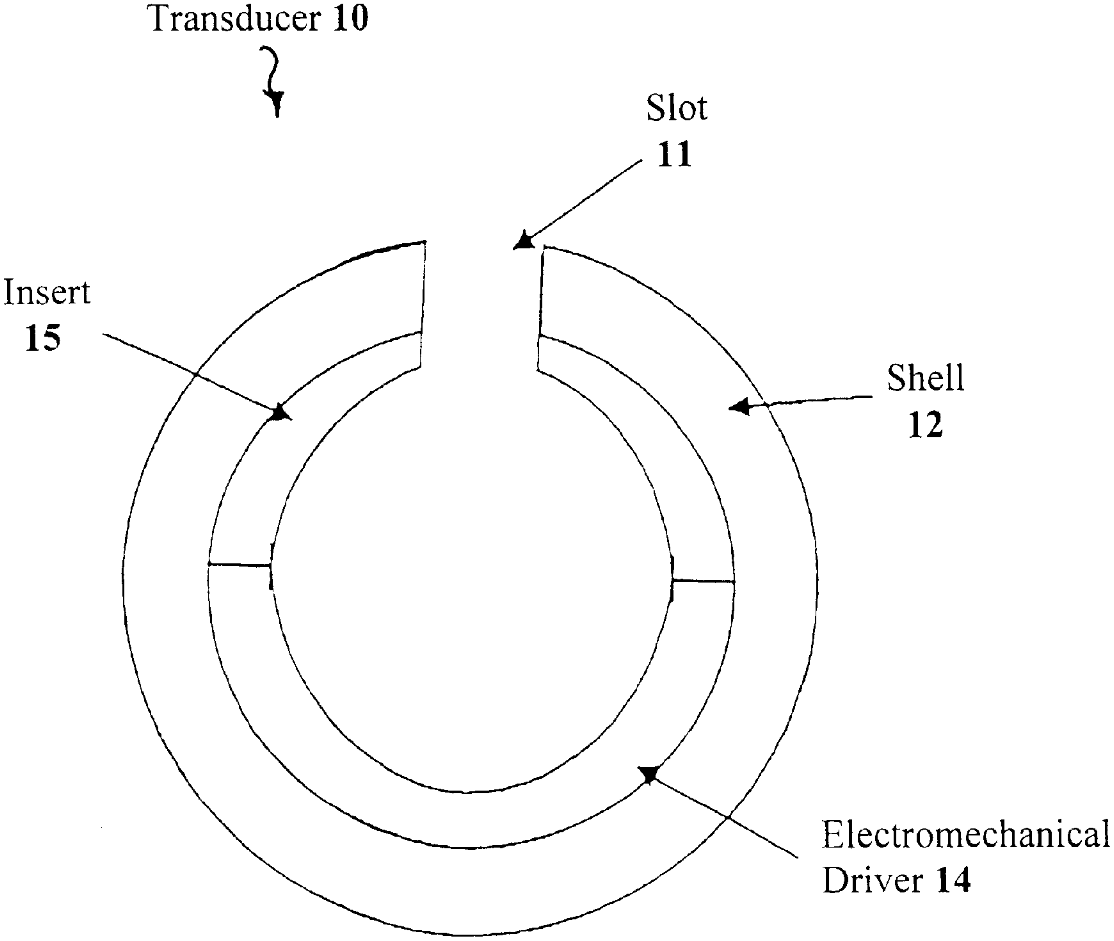
FIG. 1 is a cross sectional view a slotted cylinder transducer configured in accordance with one embodiment of the present invention.

FIG. 1 is a cross sectional view a slotted cylinder transducer configured in accordance with one embodiment of the present invention. The transducer 10 includes a shell 12 that is configured with slot 11. An electromechanical driver 14 is bonded to the inner wall of the shell 12. Two inserts 15 (one to either side of slot 11) abut the ends of the driver 14.

The shell 12 and inserts 15 can be made of aluminum, steel, durable plastic, or other suitable shell material. The electromechanical driver 14 can be made of piezoelectric, ferroelectric, or rare earth transducers, or any suitable driver material. A source of alternating current or voltage can be applied across the electromechanical driver 14 to cause vibrations.

The general configuration and form of the transducer 10 is conventional. However, the electromechanical driver 14 is vacuum chamber coated with a degassed polyester varnish on all exposed sides of the driver. Note that the fourth, unexposed side is bonded to the inner wall of the shell 12. The bonding material (e.g., non-conductive adhesive or epoxy that does not absorb water) should therefore fully cover the fourth surface to protect the driver 14. Alternatively, the driver 14 can be coated on all four sides, and then bonded to the inner wall the shell 12.

Other embodiments will be apparent in light of this disclosure. For example, shell 12 can be an oval-shape instead of ring-shaped. Also, the electromechanical driver 14 can be configured as a straight stack running from end to end of a ring or oval shaped shell 12, as opposed to the illustrated circumferential stack.

Figure 2:
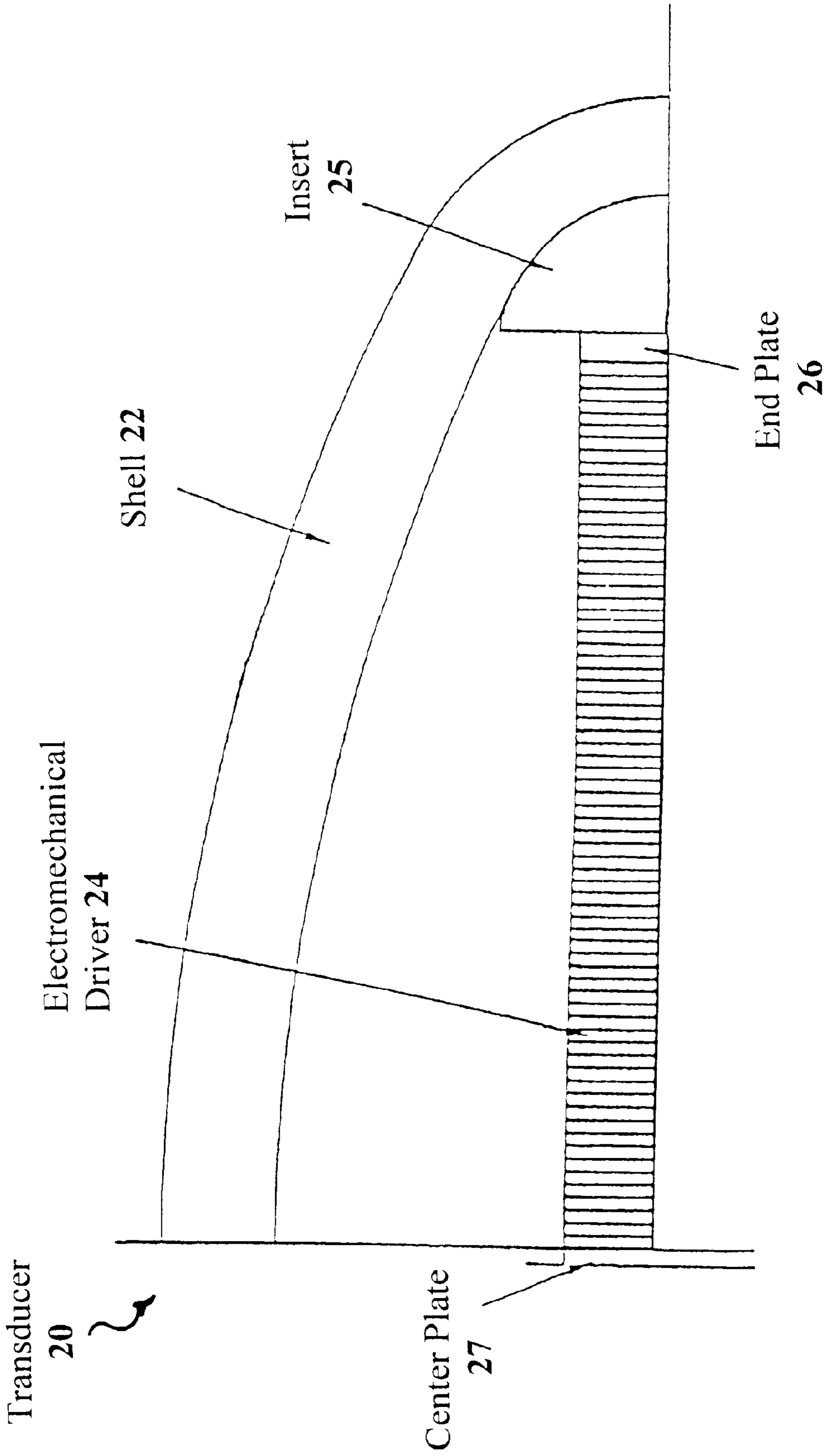
FIG. 2 is a quarter view illustration of a class IV flextensional shell transducer configured in accordance with one embodiment of the present invention.

FIG. 2 is a quarter view illustration of a class IV flextensional shell transducer configured in accordance with one embodiment of the present invention. The transducer 20 includes an oval shell 22, which is symmetrical about the x and y axis. An electromechanical driver 24 is retained between an end plate 26 and a center plate 27 internal to shell 22. A second electromechanical driver 24 (not shown) is retained between a second end plate 26 (not shown) and the center plate 27 internal to shell 22. Two inserts 25 (one at each elongated end of the oval shell 22) abut ends of each electromechanical driver 24.

The shell 22, inserts 25, end plates 26, and center plate 27 can be made of aluminum, steel, durable plastic, or other suitable shell material. The electromechanical driver 24 can be made of piezoelectric, ferroelectric, or rare earth transducers, or any suitable driver material. A source of alternating current or voltage can be applied to actuate the electromechanical driver 14 to cause vibrations.

The general configuration and form of the transducer 20 is conventional. However, the electromechanical driver 24 is vacuum chamber coated with a degassed polyester varnish on all four exposed sides of the driver. Note that the driver 24 can have other geometric shapes (e.g., circular), and the exposed area of that shape will be coated in its entirety.

Other embodiments will be apparent in light of this disclosure. For example, the electromechanical driver 24 can be configured as a straight stack running from end to end of the oval shaped shell 22, thereby eliminating the center plate 27.

Figure 3:
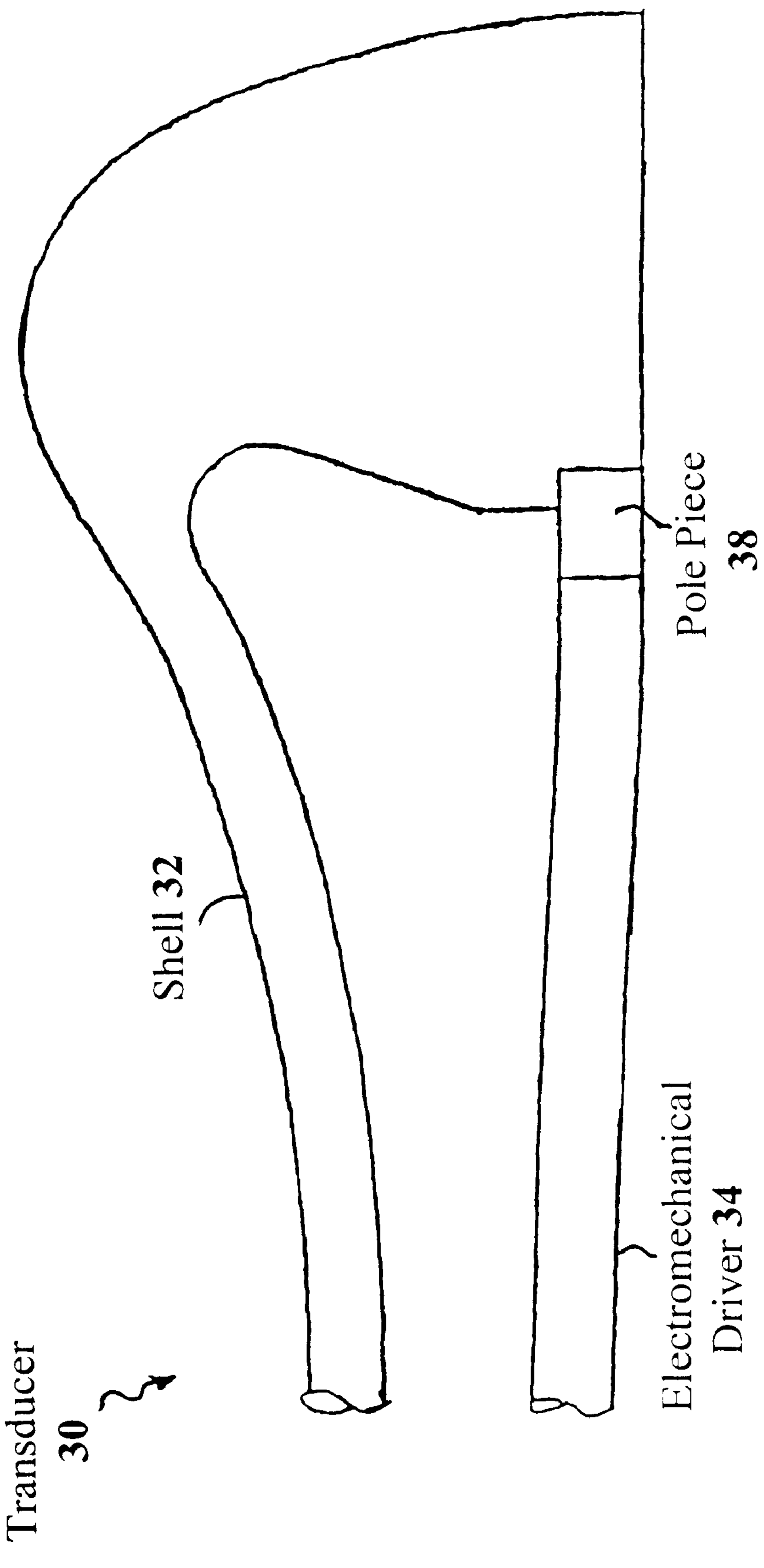
FIG. 3 is a quarter view illustration of a class VII flextensional shell transducer configured in accordance with one embodiment of the present invention.

FIG. 3 is a quarter view illustration of a class VII flextensional shell transducer configured in accordance with one embodiment of the present invention. The transducer 30 includes a dogbone-shaped shell 32, which is symmetrical about the x and y axis. The dogbone shape includes a pair of bulbous end portions (one quarter of one bulbous end portion is shown) and concave middle portion therebetween. An electromechanical driver 34 is retained between a pair of pole pieces 38 (only one shown) internal to shell 32.

The shell 32 and pole pieces 38 can be made of aluminum, steel, durable plastic, or other suitable shell material. The electromechanical driver 34 can be made of piezoelectric, ferroelectric, or rare earth transducers, or any suitable driver material. A source of alternating current or voltage can be applied to actuate the electromechanical driver 34 to cause vibrations.

The general configuration and form of the transducer 30 is conventional. However, the electromechanical driver 34 is vacuum chamber coated with a degassed polyester varnish on all four exposed sides of the driver. Note that the driver 24 can have other geometric shapes (e.g., circular), and the exposed area of that shape will be coated in its entirety.

Other embodiments will be apparent in light of this disclosure. For example, the electromechanical driver 34 can be retained in machined grooves included in the bulbous end portions of the shell 32, thereby eliminating the pole pieces 38. Also, a pair of electromechanical drivers (as opposed one long driver) can be employed, with each driver retained between a respective pole piece 38 and a center plate (not shown) internal to shell 32.

FIGS. 1–3 illustrate a few example transducer types where the degassed polyester varnish can be utilized. These examples are not intended as limitations on the present invention. Rather, the principles of the present invention can be applied to any transducer type having a driver that needs to be protected from the likes of water, voltage breakdown, and physical damage.

Polyester Varnish Coating

Lab testing was performed on many types of materials to select the one exhibits the best characteristics for improving upon transduction driver coating technology. Polyester varnish was found to be superior. Generally stated, a properly selected polyester varnish provides stronger adhesion, higher heat resistance, better resistance to voltage breakdown, and is more resistant to water than conventionally used transduction driver coatings.

In one embodiment, the selected polyester varnish is AC-43, which is a modified polyester varnish produced by the John C. Dolph Company in Monmouth Junction, N.J. AC-43 has a dry dielectric strength of 1800+ V/mil, and has a typical viscosity of 20 to 70 CPS at 25° C. The polyester varnish is "modified" in the sense that it can cured or air dried at around 25° C. Such a quality is necessary when the stack material making up the driver is temperature sensitive. For instance, a typical ceramic piezoelectric transducer element should not be subjected to temperature greater than 120° F. Thus, coating materials having significantly higher cure temps cannot be used to coat such temperature sensitive devices.

In general, any water resistant polyester varnish that cures by air drying at room temperature (e.g., 1° C. to 48° C.), and has a dry dielectric strength above 1000 V/mil and a viscosity of less than 200 CPS at 25° C., can be used as discussed herein. A number of manufacturers provide or will eventually provide polyester varnishes having qualities similar to those of AC-43. Any such polyester varnishes can be employed in accordance with the principles of the present invention. The present invention is not intended, therefore, to be limited to any one particular type of polyester varnish, or to specific dielectric strength and curing parameters.

Methodology

AC-43 or other suitable polyester varnish can be degassed with conventional techniques thereby providing a "degassed polyester varnish." The degassed polyester varnish can then be applied in layers or coats as necessary. Note that the number of coats applied will depend in part on the viscosity of the particular polyester varnish selected for the coating. A thicker viscosity will tend to require less coats, but may not penetrate the pore of the driver as well as a thinner viscosity.

Figure 4:
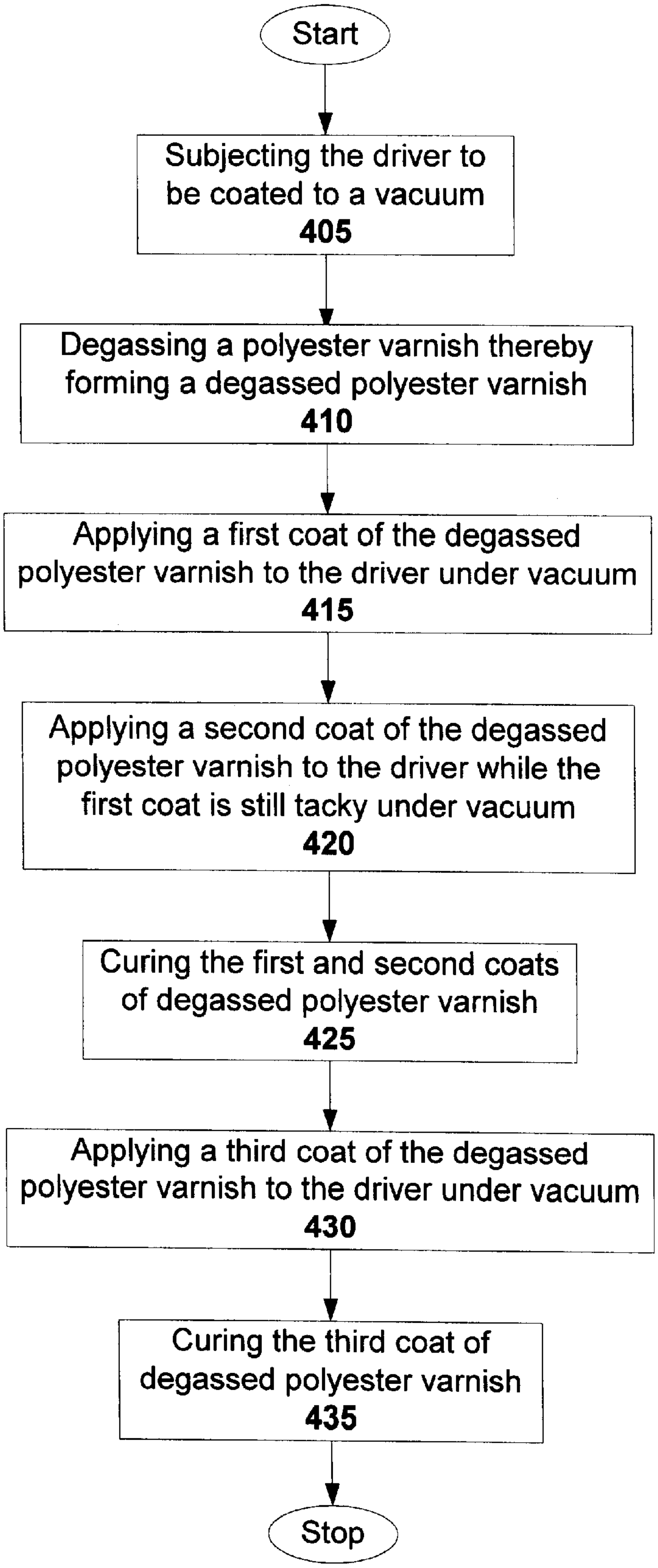
FIG. 4 illustrates a method of coating a transduction driver in accordance with one embodiment of the present invention.

FIG. 4 is a flow chart illustrating a method of coating a transduction driver in accordance with one embodiment of the present invention.

The method begins with subjecting 405 the driver to be coated to a vacuum. This allows moisture in the driver to be removed, which will improve the results of the coating process. In one embodiment, the driver is left in a vacuum (e.g., 27 to 30 inches of Hg) for about 1 to 2 hours. Note that the larger the driver, the longer the time it should be held in the vacuum. In an alternative embodiment, the driver can be subjected to heat for a period of time to remove unwanted moisture. Alternatively, this preliminary step can be skipped depending on the desired results.

The method proceeds with degassing 410 a polyester varnish (e.g., AC-43) thereby forming a degassed polyester varnish, and applying 415 a first coat of the degassed polyester varnish to the driver while under vacuum (e.g., 27 to 30 inches of Hg). In one embodiment, the degassing and applying steps are performed simultaneously, where the driver to be coated is submerged in a tub of the polyester varnish located in a vacuum chamber. The vacuum chamber can then be pumped down. The vacuum can be maintained for a set period of time, thereby gently pulling gas from the polyester varnish in which the driver is dipped. In this sense, the polyester varnish is degassed by virtue that it is applied under a vacuum. In one embodiment, the driver remains dipped and under vacuum for about 1 to 2 hours. Note, however, that larger drivers may require longer dip periods.

In an alternative embodiment, degassing the polyester varnish includes passing an inert gas such as Helium or triple bonded Nitrogen ($N_2$) through the polyester varnish while under vacuum for about an hour before the driver is dipped, brushed, or sprayed with the degassed polyester varnish. Such an embodiment may provide a higher degree of degassing. However, the polyester varnish will be significantly disturbed (e.g., bubbling and foaming) by such degassing, and may require a calming period before coating can commence, thereby increasing manufacturing time.

Any vacuum chamber suitable for work with the driver types to be coated can be used here, whether the polyester varnish is applied by dipping, brushing, spraying, or a combination thereof.

The method further includes applying 420 a second coat of the degassed polyester varnish to the driver while the first coat is still tacky under vacuum. In one embodiment, the first coat of degassed polyester varnish is allowed to air dry (e.g., at room temp) for about ¾ to 1½ hours, or until it is tacky to the touch. This air drying can take place under an enclosed vapor hood. Alternatively, the air drying can take place inside the unpumped vacuum chamber, but will generally take longer. Once the first coat is tacky, the driver can be submerged into the polyester varnish and held at a vacuum again (e.g., 1 to 2 hours) for application of the second coat.

The method proceeds with curing 425 the first and second coats of degassed polyester varnish. In one embodiment, AC-43 is applied for the first and second coats, and the curing 425 includes allowing the coats to air dry at room temperature under an enclosed vapor hood for about 24 to 48 hours, once again the cure time depending on the size of the driver. Alternatively, the vacuum chamber can be brought back to atmosphere for the curing stages, and the curing can take place within the chamber. As will be appreciated, curing will generally take longer without the assistance of a vapor hood or similar equipment.

Once the first and second coats are cured, the method continues with applying 430 a third coat of the degassed polyester varnish to the driver under vacuum, and curing 435 the third coat of degassed polyester varnish. The application of the third coat can be carried out just as the first coat was applied (e.g., 1 to 2 hour dip in polyester varnish under vacuum). Likewise, the curing of the third coat can be carried out just as the first and second coats were cured (e.g., 1 to 2 days in an enclosed vapor hood).

Note that applying the first, second, and third coats can be carried out, for example, by dipping, brushing, spraying, or other suitable application techniques. However, the spraying and brushing techniques will require more sophisticated equipment (e.g., programmed robotics) given the vacuum condition, thereby increasing manufacturing costs.

Once the driver coating process is complete, the driver can be installed into a projector shell for use in, for example, underwater applications. Alternatively, the driver can be coated while installed in the projector shell, although such a process adds complexity to the process, such as requiring a larger vacuum chamber and shell masking procedures. In any case, a coating process in accordance with the principles of the present invention results in a coating having higher dielectric strength, higher thermal breakdown, further penetration into the driver pores, good adhesion properties, and water resistance. Higher drive levels, higher power density, better reliability and better repairability are therefore enabled.

The method may be carried out, for example, as part of a overall manufacturing process, or to treat transduction drivers already in the field. The method may be implemented manually, automatically, or some combination thereof. For instance, transduction drivers to be coated can be provided to a staging area by a technician. A robotic arm can be programmed to retrieve a staged driver, and to load it into a dipping tub filled with polyester varnish in a vacuum chamber. The chamber can then be automatically pumped down, so that degassing and coating can take place.

The foregoing description of the embodiments of the invention has been presented for the purposes of illustration and description. It is not intended to be exhaustive or to limit the invention to the precise form disclosed. Many modifications and variations are possible in light of this disclosure. For example, depending on the viscosity of the degassed polyester varnish, more or less coats may be applied to the transduction driver. Generally stated, the lower or "thinner" the viscosity, the more coats that can be applied. Alternatively, the thicker the viscosity, the less coats that need be applied to provide the desired protection and sealing effect. It is intended that the scope of the invention be limited not by this detailed description, but rather by the claims appended hereto.

What is claimed is:

1. A coating for transduction drivers comprising:

a first coat of degassed polyester varnish that is applied to a transduction driver under vacuum;

a second coat of degassed polyester varnish that is applied to the transduction driver under vacuum while the first coat is still tacky; and a third coat of degassed polyester varnish that is applied to the transduction driver under vacuum after the first and second coats are cured.

2. The coating of claim 1 wherein the first, second, and third coats are cured by air drying at room temperature.

3. The coating of claim 1 wherein the degassed polyester varnish has a dry dielectric strength of greater than 1000 V/mil.

4. The coating of claim 1 wherein the degassed polyester varnish has a viscosity under 200 CPS.

5. The coating of claim 1 wherein the degassed polyester varnish is degassed by virtue that it is applied under a vacuum.

6. A method of coating a transduction driver, the method comprising:

degassing a polyester varnish thereby forming a degassed polyester varnish;

applying a first coat of the degassed polyester varnish to the driver while under vacuum;

applying a second coat of the degassed polyester varnish to the driver while the first coat is still tacky under vacuum;

curing the first and second coats of degassed polyester varnish;

applying a third coat of the degassed polyester varnish to the driver under vacuum after the first and second coats are cured; and curing the third coat of degassed polyester varnish.

7. The method of claim 6 further including the preliminary step of:

subjecting the transduction driver to be coated to at least one of heat and a vacuum to remove unwanted moisture.

8. The method of claim 6 wherein the degassing and applying steps are performed simultaneously, and the degassing is achieved by virtue that the polyester varnish is applied under a vacuum.

9. The method of claim 6 wherein the polyester varnish has a dry dielectric strength of greater than 1000 V/mil.

10. The method of claim 6 wherein the polyester varnish has a viscosity under 200 CPS.

11. The method of claim 6 wherein degassing the polyester varnish includes passing an inert gas through the polyester varnish while under vacuum.

12. The method of claim 6 wherein applying the first, second, and third coats is carried out by at least one of dipping, brushing, and spraying the transduction driver.

13. The method of claim 6 wherein curing the first and second coats includes allowing the coats to air dry at room temperature.

14. The method of claim 6 wherein curing the third coat includes allowing the coat to air dry at room temperature.

15. A coating for transduction drivers comprising:

one or more coats of polyester varnish that has been degassed, wherein each coat is applied to a transduction driver under vacuum.

16. The coating of claim 15 wherein the one or more coats of degassed polyester varnish include:

a first coat of the degassed polyester varnish that is applied to the transduction driver under vacuum; and a second coat of the degassed polyester varnish that is applied to the transduction driver under vacuum while the first coat is still tacky.

17. The coating of claim 16 wherein the one or more coats of degassed polyester varnish further includes:

a third coat of the degassed polyester varnish that is applied to the transduction driver under vacuum after the first and second coats are cured.

18. The coating of claim 15 wherein the first, second, and third coats are cured by air drying at room temperature.

19. The coating of claim 15 wherein the polyester varnish has a dry dielectric strength of greater than 1000 V/mil.

20. The coating of claim 15 wherein the polyester varnish has a viscosity under 200 CPS.

21. The coating of claim 15 wherein the polyester varnish is degassed by virtue that it is applied under a vacuum.

* * * * *